United States Patent [19]

Irwin

[11] Patent Number: 6,068,571
[45] Date of Patent: May 30, 2000

[54] DRIVE AXLE ASSEMBLY HAVING A RING GEAR ADJUSTABLY SECURED TO A DIFFERENTIAL CASE

[75] Inventor: Earl James Irwin, Ft. Wayne, Ind.

[73] Assignee: Dana Corporation, Toledo, Ohio

[21] Appl. No.: 09/281,234

[22] Filed: Mar. 30, 1999

[51] Int. Cl.[7] ................................................ F16H 55/18
[52] U.S. Cl. ........................ 475/230; 475/246; 74/409; 74/606 R
[58] Field of Search ................................ 475/230, 231, 475/346; 74/409, 665 H, 606 R

[56] References Cited

U.S. PATENT DOCUMENTS

| | | |
|---|---|---|
| 238,516 | 3/1881 | Merrit . |
| 1,378,723 | 5/1921 | Ross . |
| 2,143,968 | 1/1939 | Alden . |
| 3,826,151 | 7/1974 | F'Geppert . |
| 3,872,741 | 3/1975 | Berchtold et al. . |
| 4,532,822 | 8/1985 | Godlewski . |
| 4,754,847 | 7/1988 | Glaze et al. ........................ 74/467 X |
| 4,796,488 | 1/1989 | Hagin et al. . |
| 5,070,745 | 12/1991 | Lindsey et al. . |
| 5,094,117 | 3/1992 | Mikel et al. . |
| 5,269,731 | 12/1993 | Scudder et al. .................... 74/606 R X |
| 5,320,587 | 6/1994 | Bodtker et al. . |
| 5,806,371 | 9/1998 | Hibbler et al. ............................ 74/409 |

*Primary Examiner*—Khoi Q. Ta
*Attorney, Agent, or Firm*—Liniak, Berenato, Longacre & White

[57] ABSTRACT

An adjustment collar for a positioning a ring gear to a differential case. The ring gear is splined to the differential case so as to allow axial displacement. The adjustment collar is threaded onto the differential case adjacent to the ring gear. The adjustment collar is rotated to axially position the adjustment collar, and consequently the ring gear relative to the differential case and axle assembly. The adjustment collar and ring gear are bolted to one another to prevent relative rotation there between. Because the ring gear is splined to the differential case, relative rotation between the ring gear and differential case, and consequently the adjustment collar and the differential case, is prevented. Because the ring gear and adjustment collar are locked to one another, the two components are thus prevented from both axial and rotational movement. The arrangement provides the ability to selectively position the ring gear axially after the differential assembly is installed in the housing, thus eliminating the need for shims or other cumbersome expensive adjusting devices. The overall axle assembly is then assembled with tighter tolerance.

8 Claims, 4 Drawing Sheets

6,068,571

DRIVE AXLE ASSEMBLY HAVING A RING GEAR ADJUSTABLY SECURED TO A DIFFERENTIAL CASE

FIELD OF THE INVENTION

The present invention relates to an adjustable ring gear in an axle assembly and more particularly to an adjustment collar for selectively positioning a ring gear relative to a differential case.

DESCRIPTION OF THE PRIOR ART

Axle assemblies of the prior art include a differential case mounted in the carrier of the axle assembly. A ring gear is often formed on an outer peripheral surface to interface with a pinion gear to drive the ring gear and provide power to the axles. Many ring gears are formed of a separate piece and are bolted to the differential case. In such a case, to account for assembly tolerances, shim packs may be disposed between the ring gear and the differential case to properly align the ring gear with the pinion gear once the differential assembly is installed in the carrier. Such prior art assemblies are costly, cumbersome, and required the differential case to be removed from the carrier and the ring gear detached from the differential case in order to adjust the portion of the ring gear. Often the prior art differential assemblies provide no significant means to adjust the position of the ring gear resulting in reduced performance and premature wear of the axle assembly. Other methods of adjusting the axial position of the ring gear include incorporating shims outside of the side bearings. This method shifts the entire differential assembly in order to properly align the ring gear. The differential must be removed and shims placed outside of the differential bearing cups prior to installation of the bearing caps. This method is also time consuming as the differential must be install in the carrier, measurements taken, the differential removed, shims placed, and the differential reinstalled. Often, the differential case must be reinstalled many times, during this trial and error approach, before the ring gear is properly aligned with the pinion gear.

SUMMARY OF THE INVENTION

An axle assembly employs a simple adjustable connection between the ring gear and differential case. An adjustment collar facilitates positioning the ring gear to the differential case. The ring gear is splined to the differential case so as to allow axial displacement. The adjustment collar is threaded onto the differential case adjacent to the ring gear. The adjustment collar is rotated to axially position the adjustment collar, and consequently the ring gear, relative to the differential case and axle assembly. The adjustment collar and ring gear are bolted to one another to prevent relative rotation there between. Because the ring gear is splined to the differential case, relative rotation between the ring gear and differential case, and consequently the adjustment collar and the differential case, is prevented. Because the ring gear and adjustment collar are locked to one another, the two components are thus prevented from both axial and rotational movement. The arrangement provides the ability to selectively position the ring gear axially after the differential assembly is installed in the housing, thus eliminating the need for shims or other cumbersome expensive adjusting devices. The overall axle assembly is then assembled with tighter tolerance.

DETAILED DESCRIPTION OF THE PREFERRED EMBODIMENT

Figure 1:
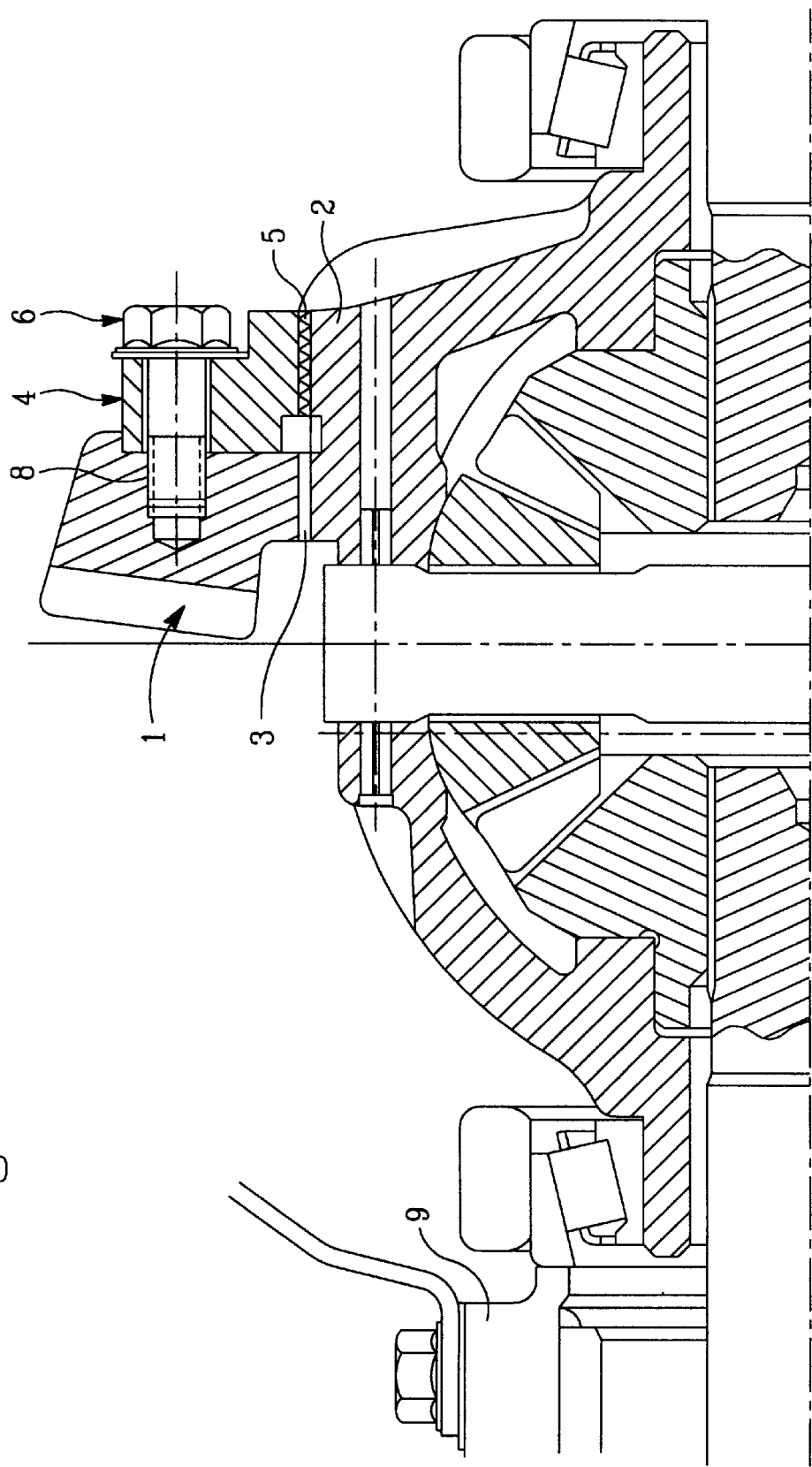
FIG. 1 is a partial sectional view of an axle assembly adjustable ring gear assembly of the present invention.
Figure 2:
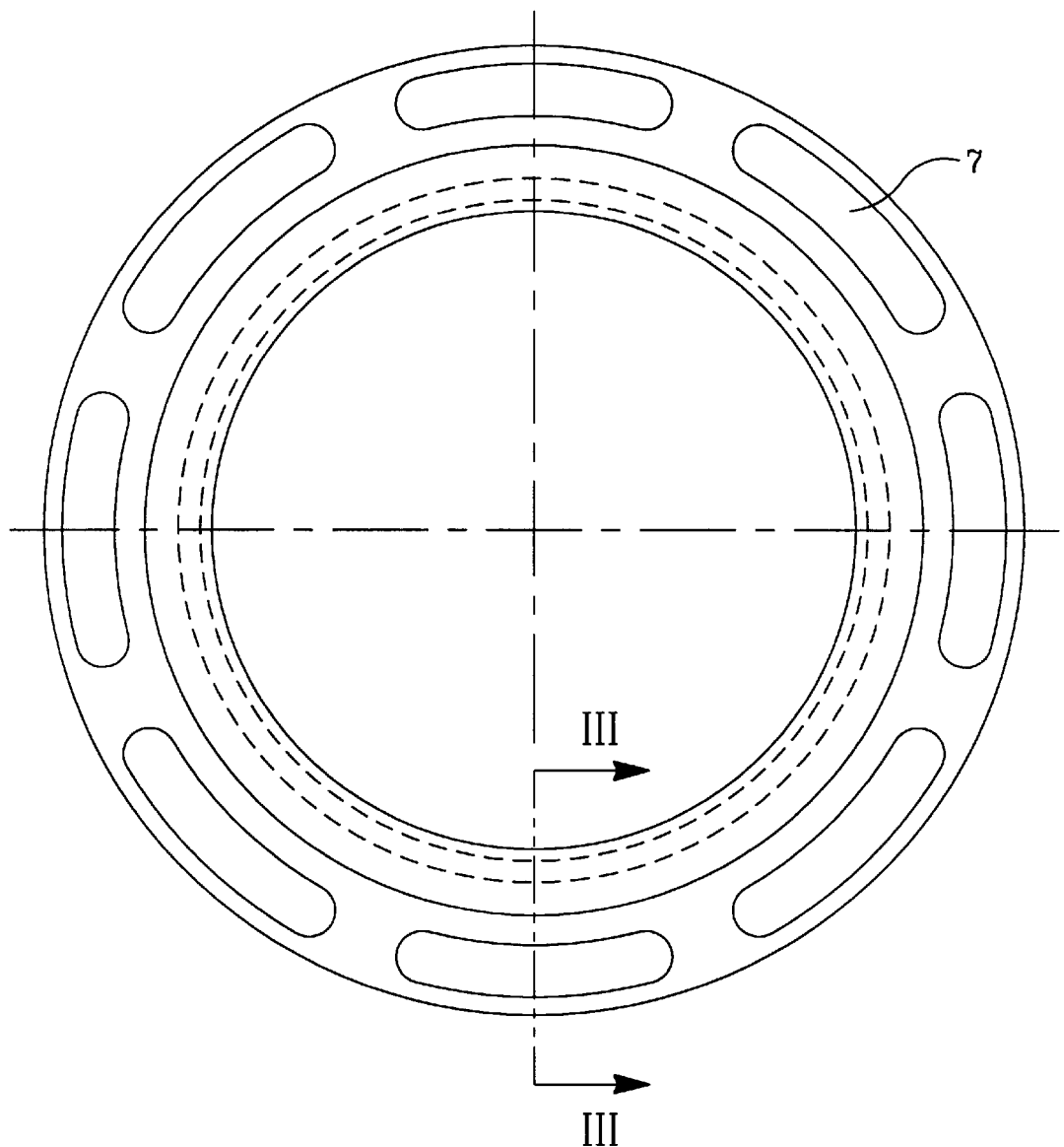
FIG. 2 is a front view of the adjustment collar of the adjustable assembly according to the present invention.
Figure 3:
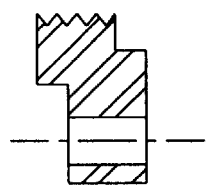
FIG. 3 is a sectional view of the adjustment collar taken along lines 3—3 of FIG. 2. according to the present invention.

FIG. 1 depicts a conventional axle assembly with a novel connection between the ring gear 1 and the differential casing 2. The ring gear 1 is splined onto the differential case 2 via a splined interface 3. This connection prevents relative rotation between the ring gear 1 and differential case 2 while permitting axial displacement. An adjustment collar 4 threadingly engages the differential case 2 via a threaded interface 5. This connection allows axial displacement of the adjustment collar 4 when rotated relative to the differential case 2 and prevents axial displacement when the adjustment collar 4 is prevented from relative rotation. In order to securely fix the ring gear 1 and adjustment collar 4 to the differential case 2, the adjustment collar 4 is bolted to the ring gear 1 via bolt 6. A plurality of bolts 6 may be employed circumferntially about the ring gear 1. Preferably, the bolts are spaced apart equally for balancing. The bolt 6 extends through grooves 7 formed in the adjustment collar 4 and threadingly engages a corresponding recess 8 formed in the ring gear 1.

The present invention provides the ability to adjust the axial position of the ring gear 1 after the differential case is installed in the carrier 9. When assembling the axle assembly of the present invention, the ring gear 1 is splined onto, and the adjustment collar 4 threaded onto, the differential case 2. Once the ring gear 1 and adjustment collar 4 are mounted onto the differential case 2, the differential case is mounted into the carrier 9 as is conventionally known. The ring gear 1 can then be selectively axially positioned without the need for shims, or removed for re-packing or other cumbersome modification. The ring gear 1 can be adjusted in place to account for assembly tolerances.

Once the differential case is mounted in the carrier 9, the ring gear 1 can be positioned axially. The adjustment collar 4 is rotated to achieve a desired ring gear 1 position. That is, when the ring gear 1 is maintained against the adjustment collar 4, axial adjustment of the collar 4 will displace the ring gear 1 to the desired position. Once the ring gear 1 is in the desired position, the collar 4 bolts 6 or bolted to the ring gear 1 through grooves 7 thereby securing the adjustment collar 4 to the ring gear 1. The ring gear 1 is prevented from relative rotation by the spline interface 3. The adjustment collar 4 is in turn prevented from relative rotation by bolts 6, and the ring gear 1 and adjustment collar 4 are prevented from axial displacement by the threaded interface 5. The resulting assembly provides an adjustably connection between the ring 1 gear and the differential case. Moreover, this assembly provides for adjustment of the ring gear 1 while the differential case is mounted into the carrier 9. The assembly results in significant reduction in assembly time, provides better tolerance, and eliminates complicated, cumbersome, and costly shim pack methods.

Figure 4:
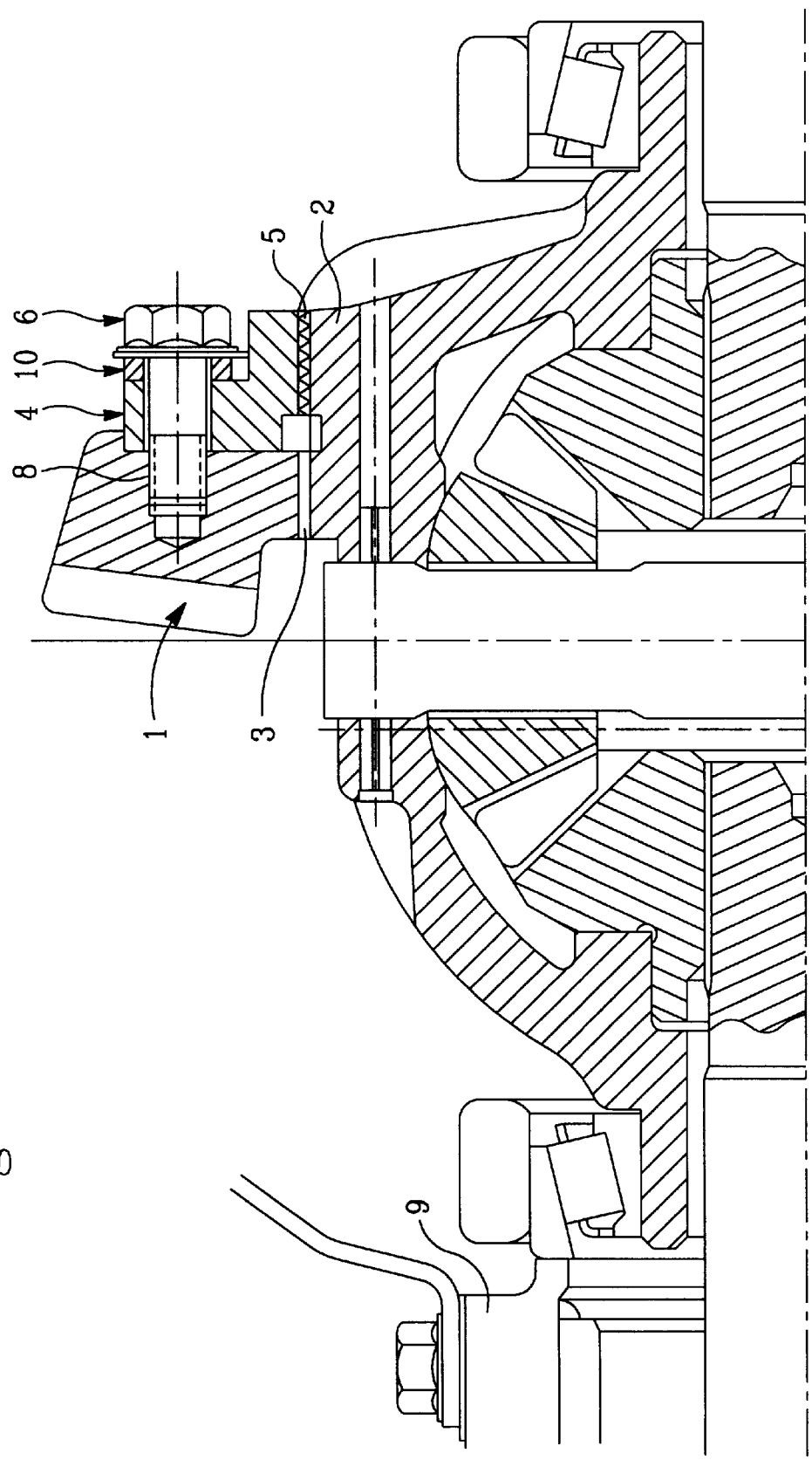
FIG. 4 is an alternate embodiment of the present invention employing a ring washer.
Figure 5:
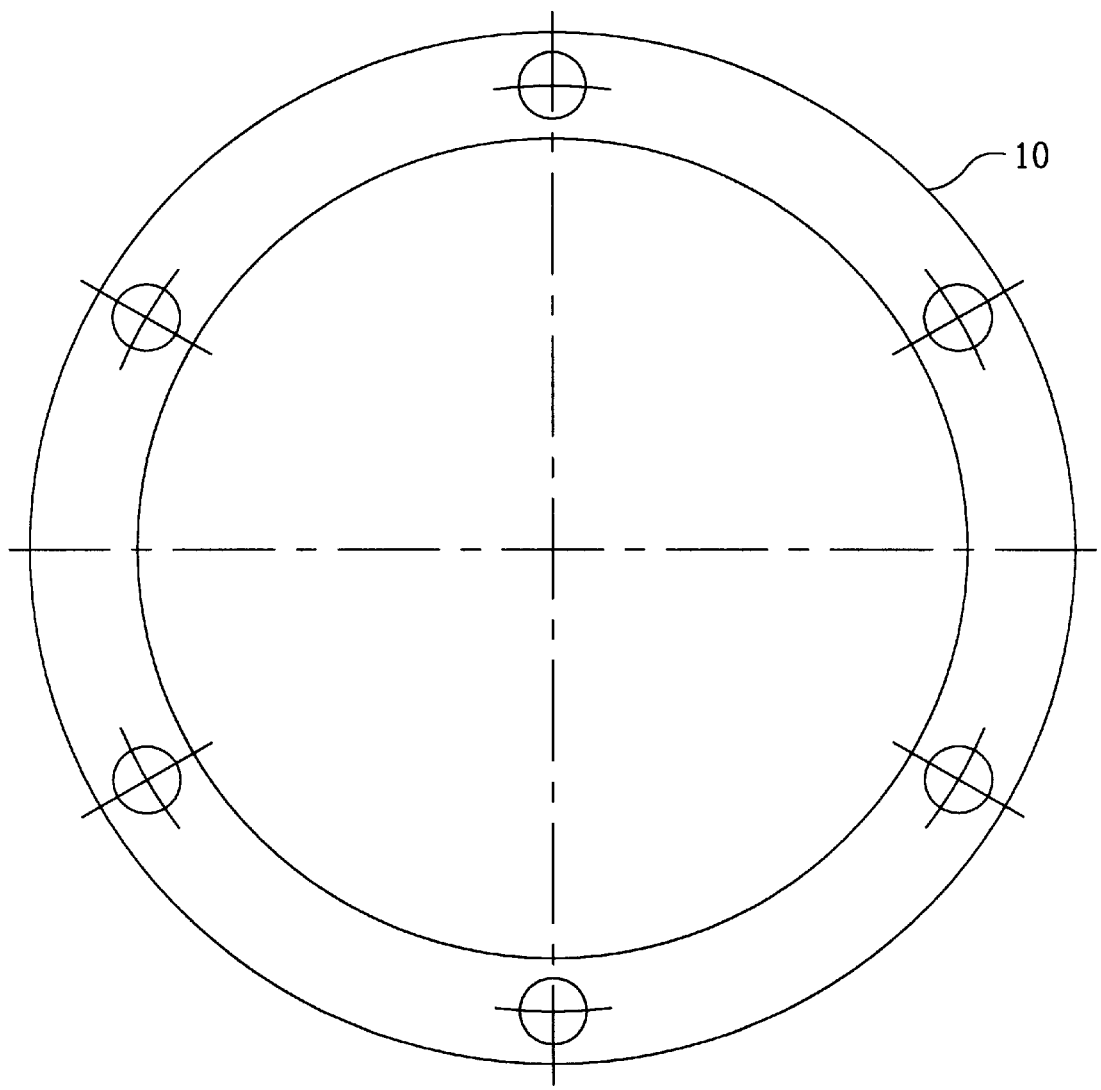
FIG. 5 is a front view of the ring washer employed in the alternate embodiment of the FIG. 5.
Figure 6:
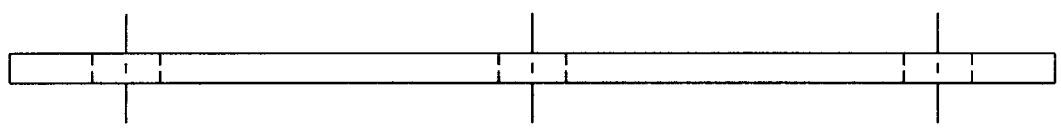
FIG. 6 is a side view of the ring washer shown in FIG. 5.

In an alternate embodiment a ring washer 10 is disposed between the adjustment collar 4 and the ring gear 1 as shown in FIG. 4. The ring washer 10 has a plurality of bores 11 corresponding to the number of bolts used to secure the adjustment collar 4 to the ring gear 1. Preferably, the number of bores 11 corresponds to the number of grooves 7 formed in the adjustment collar 4. FIGS. 5 and 6 show the ring washer 10 having six bores. Increasing the length of grooves 7 increases the alignment possibilities with the bore 8 formed in the ring gear 1. However, increasing the length of the grooves 7 in the adjustment collar will inherently weaken the adjustment collar 4 and the resulting connection to the ring gear 1. The additional ring washer 10 strengthens the connection between the adjustment collar 4 and ring gear 1 thereby facilitating maximum alignment possibilities while maintaining a strong connection.

While the foregoing invention has been shown and described with reference to a preferred embodiment, it will be understood by those possessing skill in the art that various changes and modifications may be made without departing from the spirit and scope of the invention

I claim:

1. A drive axle assembly comprising:

a differential case;

a ring gear non-rotatably and longitudinally slidably mounted onto said differential case an adjustment collar threadingly engaging said differential case adjacent said ring gear adapted to selectively position said ring gear and said adjustment collar in relation to said differential case, and a fastening device for locking said threaded adjustment collar to said ring gear.

2. The drive axle assembly according to claim 1, wherein said locking device comprises:

at least one bolt passing through a bore of said adjustment collar and threadingly engaging said ring gear thereby securing and locking said adjustment collar to said ring gear.

3. The drive axle assembly according to claim 1, wherein said ring gear is splined to said differential casing.

4. The drive axle assembly according to claim 2, further comprising:

a ring washer disposed between said adjustment collar and said ring gear.

5. An axle assembly comprising:

a differential case having an axis of rotation;

a ring gear non rotatably mounted to said differential case concentric with said axis of rotation; and an adjustment means for selectively positioning said ring gear relative to said differential case in a direction parallel to said axis of rotation.

6. An axle assembly comprising:

a differential case having an axis of rotation;

a ring gear non rotatably mounted to said differential case concentric with said axis of rotation; and an adjustment means for selectively positioning said ring gear in a direction parallel to said axis of rotation, wherein said adjustment means includes;

an adjustment collar threadingly engaging said differential case;

said ring gear is splined to said differential case to allow axial displacement and prevent relative rotation there between; whereby rotation of said adjustment collar facilitates selective axial positioning of said adjustment collar and said ring gear with respect to said differential case, and said adjustment collar and said ring gear are bolted together to prevent relative rotation there between, thereby fixing said ring gear in both rotational and axial positions relative to said differential case.

7. A method of positioning a ring gear relative to a differential case in an axle assembly, said method comprising the steps of:

mounting said ring gear to said differential case to allow axial translation of said ring gear relative to said differential case and preventing relative rotation there between;

threadingly mounting an adjustment collar to said differential case adjacent said ring gear, rotating said adjustment collar to a specific position to thereby position said ring gear in a desired location in relation to said differential case;

securing said adjustment collar to said ring gear to prevent relative rotation there between.

8. The method of positioning the ring gear according to claim 7, wherein said step of mounting said ring gear to said differential case includes splining said ring gear to said differential case.

* * * * *